(No Model.)
B. F. BIRKETT.
COMBINED CULTIVATOR AND LAND MARKER.
No. 331,028. Patented Nov. 24, 1885.
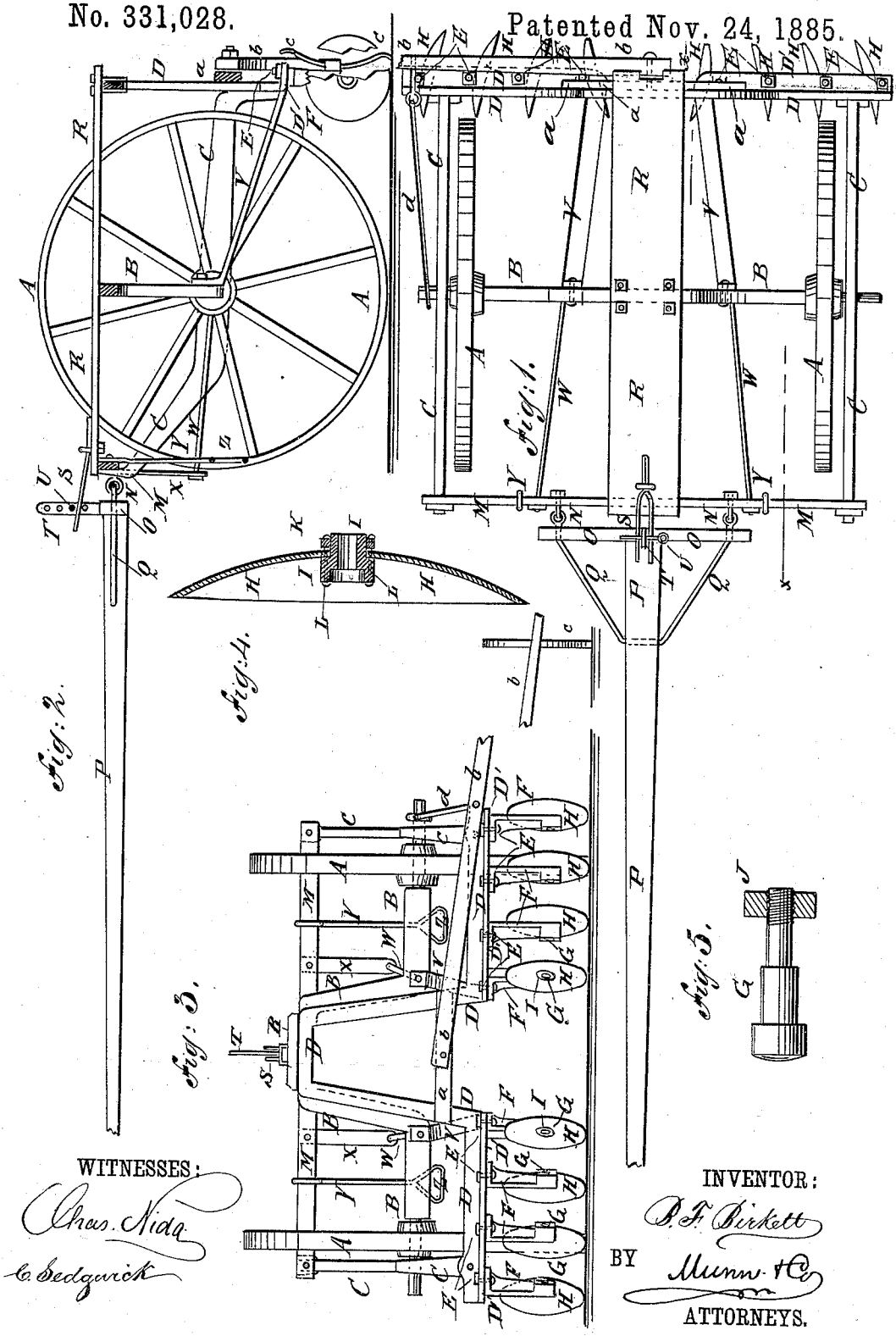
WITNESSES:
Chas. Nida
C. Sedgwick
INVENTOR:
B. F. Birkett
BY Munn & Co.
ATTORNEYS.

UNITED STATES PATENT OFFICE.

B. FRANK. BIRKETT, OF BURLINGTON, NEW JERSEY.

COMBINED CULTIVATOR AND LAND-MARKER.

SPECIFICATION forming part of Letters Patent No. 331,028, dated November 24, 1885.

Application filed August 17, 1885. Serial No. 174,619. (No model.)

*To all whom it may concern:*

Be it known that I, BENJAMIN FRANKLIN BIRKETT, of Burlington, in the county of Burlington and State of New Jersey, have invented a new and useful Improvement in Combined Cultivators and Land-Markers, of which the following is a full, clear, and exact description.

Reference is to be had to the accompanying drawings, forming a part of this specification, in which similar letters of reference indicate corresponding parts in all the figures.

Figure 1 is a plan view of one of my improved machines. Fig. 2 is a sectional side elevation of the same, taken through the line $x\,x$, Fig. 1, and part being broken away. Fig. 3 is a rear elevation of the same, part being broken away. Fig. 4 is a sectional elevation of one of the disk-plows. Fig. 5 is a side elevation of one of the disk-plow journals.

The object of this invention is to provide combined cultivators and land-markers constructed in such a manner that they can be readily adjusted for use for cultivating plants or for marking land, and can also be adjusted to throw the soil toward or from the plants, or to throw it from the plants and then toward the plants at the same passage along the row.

The invention consists in the construction and combination of various parts of the machine, as will be hereinafter fully described and then claimed.

A represents the wheels, the axle B of which is arched in its middle part, as shown in Figs. 2 and 3. To the ends of the axle B, at the outer sides of the wheels A, are attached the middle parts of the side bars, C. The rear parts of the side bars, C, are horizontal, and their rear ends are bent downward at right angles. To the downwardly-projecting rear ends of the side bars, C, are bolted or otherwise rigidly secured the ends of the rear bar, D, the middle part of which is arched, as shown in Figs. 2 and 3. The horizontal end parts of the rear bar, D, are made with rearwardly-projecting flanges, D', upon their lower edges, which are perforated to receive the bolts E, that secure the upper ends of the standards F to the said rear bar, D. The bodies of the standards F are made L-shaped in cross-section, to allow them to be made light, while having the requisite strength, and upon their upper ends are formed heads, which are perforated vertically to receive the fastening-bolts E. The lower ends of the standards F are made square, and are perforated laterally to receive the bolts G, that serve as journals to the disk-plows H. The bolts G pass through the hubs I' of the disk-plows H, have their heads countersunk into one end of the hubs, have shoulders formed upon their middle parts at the other ends of the said hubs to rest against the sides of the lower ends of the standards F, and have nuts J screwed upon their ends to rest against the other sides of the said standards and hold the journal-bolts G from turning. The hubs I at their countersunk ends are made larger and with shoulders to rest against the sides of the disk-plows H, have washers K placed upon their smaller ends to rest against the other sides of the said disk-plows, and are secured in place by rivets or bolts L, passing through the washers K, the disk-plows H, and the enlarged ends of the bolt-journals G, so that the said hubs and disk-plows will be firmly connected.

With this construction the disk-plows can be readily adjusted at a greater or less inclination, so as to throw more or less soil and to throw soil toward or from the plants; or some of the said disk-plows can be adjusted to throw soil from and others adjusted to throw soil toward the plants, as may be desired.

The forward parts of the side bars, C, are inclined upward, as shown in Fig. 2, and to their forward ends are attached the ends of the front bar, M. To the middle part of the front bar, M, are hinged, by eyebolts N or other suitable means, the cross-bar O, attached to the tongue P, the connection being strengthened by braces Q, attached to the said tongue and to the ends of its cross-bar.

To the middle part of the front bar, M, and to the arches of the axle B and rear bar, D, is attached the seat-board R, so that the driver, by sitting upon the rear part of the said seat-board, can hold the disk-plows H down to their work, and by sitting upon the forward part of the said seat-board can raise the said disk-plows out of the ground for convenience in turning around.

To the forward end of the seat-board R is attached a forwardly-projecting forked bar, S, to receive the upwardly-projecting bar T, attached to the rear end of the tongue P, and which has numerous perforations formed through it, so that by passing a pin, U, through one of the perforations of the bar T above the bar S the downward movement of the rear end of the machine, and consequently the depth to which the disk-plows H enter the ground, can be limited as desired. With this construction, also, by lowering the forward end of the machine and passing the pin U through the perforation in the bar T next above the bar S, the disk-plows H will be locked in position above the ground, and the machine can be readily drawn from place to place. To the axle B and rear bar, D, at or near the angles of their arches, are attached the ends of two bars, V. To the axle B, at or near the angles of the arch, are attached the rear ends of two bars, W, the forward ends of which are attached to the lower ends of two hangers, X', attached at their upper ends to the front bar, M, upon the opposite sides of and equally distant from the center of the said front bar. The bars V and the bars and hangers W X strengthen and give firmness and rigidity to the machine, and the bars V W also serve as rests for the driver's feet.

To the front bar, M, are connected the upper ends of two bars, Y, which have loops Z attached to or formed upon their lower ends to serve as stirrups, so that the driver, by putting his feet in the stirrups Z and throwing his weight upon them, can raise the rear part of the machine and adjust the pin U without getting off or even stopping the machine.

To the lower part of the arch of the rear bar, D, are bolted or otherwise secured the ends of a short bar, $a$, to the center of which is pivoted the end of a bar, $b$, of a length equal to twice the required distance apart of the rows, so that the said bar can be swung from one side of the machine to the other. To the outer end of the bar $b$ is rigidly attached the center of a cross-head or double shoe, $c$, so that the marker will operate at either side of the machine to form a mark to serve as a guide to the driver at his next crossing. The draft-strain upon the marker is sustained by the draft chain or rod $d$, the rear end of which is hinged or otherwise jointed to the center of the said bar $b$. The forward end of the rod or chain $d$ has a loop or ring formed upon or attached to it to receive an end of the axle B, or a pin or hook attached to the said axle or some other suitable part of the machine.

Having thus fully described my invention, I claim as new and desire to secure by Letters Patent—

1. The combination, with the wheels A, the arched axle B, the side bars, C, the arched rear bar, D, having perforated flanges D', the front bar, M, and the long seat-board R, of the adjustable standard F and the disk-plows H, substantially as herein shown and described.

2. The combination, with the standards F, of the hubs I, having shoulders, the washers K, the disk-plows H on the hubs between the shoulders and the washers, and the journal-bolt G, provided with the nut J, substantially as herein shown and described.

3. The combination, with the axle B and the frame C D M, of the bars Y, secured to the front bar, M, of the frame, and having loops in their ends, substantially as herein shown and described.

4. The combination, with the axle B, the frame C D M, and tongue P, provided with the perforated bar T, of the seat R, provided with the bars S, and the pin U, substantially as shown and described.

5. The combination, with the axle B, having its ends projecting beyond the wheels, and the arched bar D, of the cross-bar $a$, the bar $b$, pivoted to said cross-bar, the double shoe $c$ on the free end of the bar $b$, and the draft chain or bar $d$, having its ends secured to the bar $b$ and to the projecting ends of the axle, substantially as herein shown and described.

B. FRANK. BIRKETT.

Witnesses:
 DANL. P. NAYLOR,
 JAMES W. SLACK.